US012686480B2

(12) United States Patent (10) Patent No.: US 12,686,480 B2
Saruwatari et al. (45) Date of Patent: Jul. 21, 2026

(54) OUTBOARD MOTOR AND MARINE VESSEL

(71) Applicant: YAMAHA HATSUDOKI KABUSHIKI KAISHA, Iwata (JP)

(72) Inventors: Kimitaka Saruwatari, Shizuoka (JP); Yu Wakamizu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 391 days.

(21) Appl. No.: 18/229,719

(22) Filed: Aug. 3, 2023

(65) Prior Publication Data

US 2024/0067319 A1 Feb. 29, 2024

(30) Foreign Application Priority Data

Aug. 23, 2022 (JP) .................................. 2022-132472

(51) Int. Cl.
| | |
|---|---|
| *B63H 20/28* | (2006.01) |
| *B01D 35/26* | (2006.01) |
| *B63H 20/12* | (2006.01) |
| *B63H 20/14* | (2006.01) |

(52) U.S. Cl.
CPC ........... *B63H 20/285* (2013.01); *B01D 35/26* (2013.01); *B63H 20/12* (2013.01); *B63H 20/14* (2013.01); *B01D 2201/0415* (2013.01)

(58) Field of Classification Search
CPC ...... B63H 20/285; B63H 20/12; B63H 20/14; B01D 35/26; B01D 2201/0415
See application file for complete search history.

(56) References Cited

U.S. PATENT DOCUMENTS

| | | | | |
|---|---|---|---|---|
| 10,800,502 | B1 * | 10/2020 | Alby | ...................... B63H 20/28 |
| 2005/0266743 | A1 | 12/2005 | Okuyama | |
| 2020/0309015 | A1 | 10/2020 | Watanabe | |

FOREIGN PATENT DOCUMENTS

| | | | | |
|---|---|---|---|---|
| JP | 2005-335449 | A | 12/2005 | |
| JP | 4617376 | B2 | 1/2011 | |
| JP | 2020-163872 | A | 10/2020 | |
| JP | 2021030930 | A * | 3/2021 | ............. B63H 21/14 |

* cited by examiner

*Primary Examiner* — Stephen P Avila
(74) *Attorney, Agent, or Firm* — Keating & Bennett, LLP

(57) ABSTRACT

An outboard motor includes a lower portion including a propeller shaft, an upper portion including a drive source to provide a rotational force to rotate the propeller shaft, a support portion to rotatably support the lower portion relative to the upper portion about a steering shaft and rotate integrally with the lower portion, a water pump assembly in the upper portion to supply water to the drive source, and a water inlet including a first filter in the lower portion to take in external water. A water channel extends from the water inlet to the water pump assembly, and a seal is between a fixed portion fixed with respect to the upper portion and the support portion. A second filter, which has a mesh size smaller than a mesh size of the first filter, is in the water channel upstream of the seal and downstream of the water inlet.

11 Claims, 5 Drawing Sheets

OUTBOARD MOTOR AND MARINE VESSEL

CROSS REFERENCE TO RELATED APPLICATIONS

This application claims the benefit of priority to Japanese Patent Application No. 2022-132472 filed on Aug. 23, 2022. The entire contents of this application are hereby incorporated herein by reference.

BACKGROUND OF THE INVENTION

1. Field of the Invention

The present invention relates to an outboard motor and a marine vessel.

2. Description of the Related Art

Conventionally, in outboard motors, there is known a configuration in which an upper portion is not movable in a left-right direction, and a lower portion is movable in the left-right direction relative to the upper portion, thereby enabling steering (for example, see Japanese Patent No. 4617376). In such a configuration, in which only the lower portion is steered, in some cases, a configuration in which water sucked from a water inlet portion of the lower portion is sent to a drive source (an engine or the like) of the upper portion through the inside of a steering mechanism by a water pump, is used. In the case that this configuration is used, a seal portion is required between a fixed portion that is not movable by steering and a movable portion that is movable by steering.

Although relatively large foreign matter is removed by a filter provided in the water inlet portion, fine foreign matter enters a water channel. In addition, there is a possibility that the fine foreign matter gets caught in the seal portion.

On the other hand, among the outboard motors, there is also known an outboard motor that suppresses foreign matter in cooling water in multiple stages (see Japanese Laid-Open Patent Publication (kokai) No. 2020-163872). However, Japanese Laid-Open Patent Publication (kokai) No. 2020-163872 does not describe foreign matter removal in the configuration in which only the lower portion is steered. Therefore, in this configuration, in which only the lower portion is steered, there is room for improvement in terms of suppressing foreign matter from getting caught in the seal portion in a steering portion.

SUMMARY OF THE INVENTION

Preferred embodiments of the present invention provide outboard motors and marine vessels that are each able to reduce or prevent foreign matter from getting caught in a seal in a steering portion.

According to a preferred embodiment of the present invention, an outboard motor includes a lower portion including a propeller shaft, an upper portion including a drive source to provide a rotational force to rotate the propeller shaft, a support portion to rotatably support the lower portion relative to the upper portion about a steering shaft and rotate integrally with the lower portion, a water pump assembly in the upper portion to supply water to the drive source, and a water inlet including a first filter in the lower portion to take in external water. A water channel extends from the water inlet to the water pump assembly via the support portion. A seal to seal the water channel is provided between a fixed portion fixed with respect to the upper portion and the support portion. A second filter, which has a mesh size smaller than a mesh size of the first filter, is provided in the water channel upstream of the seal and downstream of the water inlet.

According to another preferred embodiment of the present invention, an outboard motor includes a lower portion including a propeller shaft, an upper portion including a drive source to provide a rotational force to rotate the propeller shaft, a support portion to rotatably support the lower portion relative to the upper portion about a steering shaft and rotate integrally with the lower portion, a water pump assembly in the upper portion to supply water to the drive source, and a water inlet including a first filter in the lower portion to take in external water. A water channel extends from the water inlet portion to the water pump assembly via the support portion. A seal to seal the water channel is provided between a fixed portion fixed with respect to the upper portion and the support portion. A second filter, which has a filtration accuracy higher than a filtration accuracy of the first filter, is provided in the water channel upstream of the seal and downstream of the water inlet.

According to another preferred embodiment of the present invention, a marine vessel includes the outboard motor described above.

According to a preferred embodiment of the present invention, the foreign matter that is able to pass through the first filter but is not able to pass through the second filter does not reach the seal. Therefore, it is possible to prevent the foreign matter from getting caught in the seal. As a result, it is possible to reduce or prevent foreign matter from getting caught in the seal in the steering portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
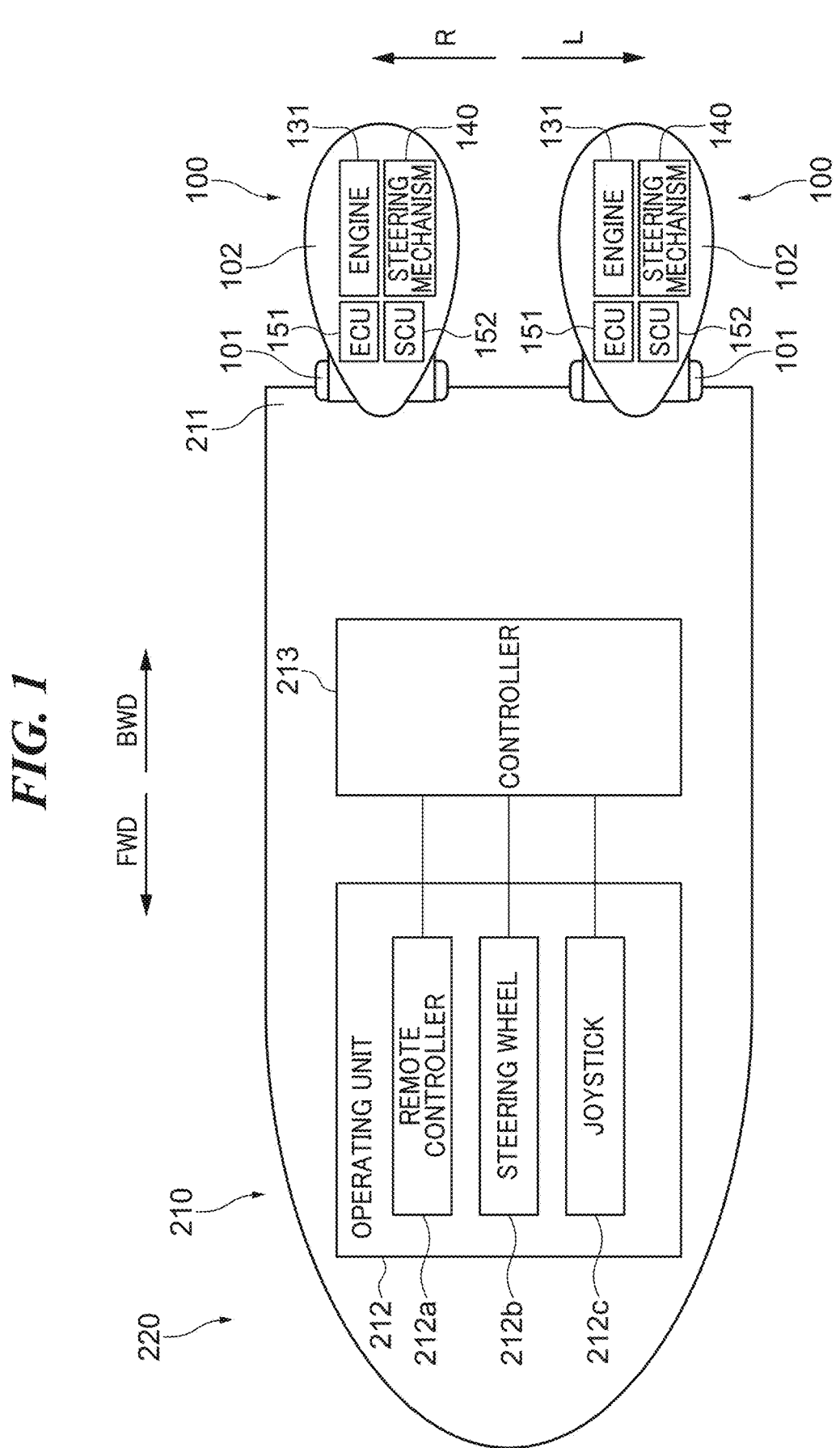
FIG. 1 is a schematic plan view of a marine vessel to which an outboard motor according to a preferred embodiment of the present invention is applied.
Figure 2:
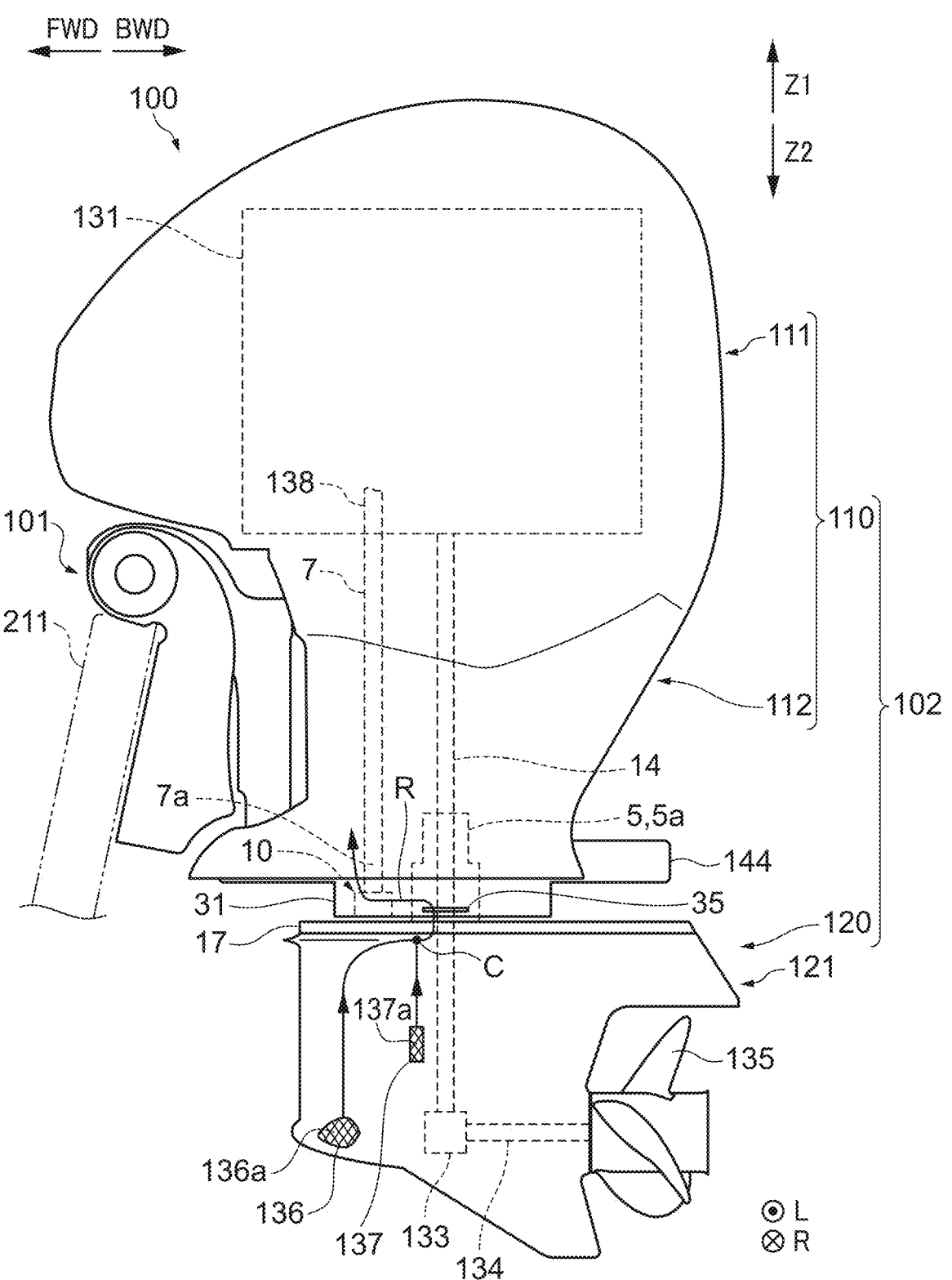
FIG. 2 is a schematic left side view of an outboard motor according to a preferred embodiment of the present invention.

FIG. 1 is a schematic plan view of a marine vessel 220 to which an outboard motor 100 according to a preferred embodiment of the present invention is applied. FIG. 2 is a schematic left side view of the outboard motor 100 according to a preferred embodiment of the present invention.

As shown in FIG. 1, the marine vessel 220 includes a hull 210 and the two outboard motors 100. In FIGS. 1 and 2, FWD, BWD, L, R, Z1, and Z2 indicate the front, the rear, the left, the right, the upper, and the lower directions of the marine vessel 220, respectively.

As shown in FIG. 1, the two outboard motors 100 are attached to a stern 211 of the hull 210 so as to be aligned in the left-right direction. Since the two outboard motors 100 have the same configuration, one outboard motor 100 will be described as a representative. It should be noted that the number of the outboard motors 100 provided in the marine vessel 220 is not limited to two, and may be one or three or more. The outboard motor 100 is a marine vessel propulsion device to propel the hull 210. The outboard motor 100 includes an engine 131, a steering mechanism 140, an ECU (Engine Control Unit) 151, and an SCU (Steering Control Unit) 152.

As shown in FIG. 1, the hull 210 includes a controller 213 and an operating unit 212 that accepts operations to steer (maneuver) the marine vessel 220. The operating unit 212 includes a remote controller 212a, a steering wheel 212b, and a joystick 212c.

By tilting a lever (not shown) provided in the remote controller 212a, changing of a thrust of the outboard motor 100 (a rotation number of a propeller 135 (see FIG. 2)), switching of a shift state of the outboard motor 100 (switching between a forward state, a reverse state, and a neutral state), etc. are performed. By rotating the steering wheel 212b, steering of the outboard motor 100 (changing of the direction of the propeller 135 relative to the hull 210), etc. is performed. In the marine vessel 220, translational movement, turning, etc. of the marine vessel 220 are performed by a combination of the operation of the remote controller 212a and the operation of the steering wheel 212b.

The joystick 212c is provided with a tiltable and rotatable lever (not shown). By tilting, rotating, or tilting and rotating the lever of the joystick 212c, the changing of the thrust of the outboard motor 100, the switching of the shift state of the outboard motor 100, the steering of the outboard motor 100, etc. are performed. By operating the lever of the joystick 212c, it is possible to perform the translational movement, turning, pivot-turning, etc. of the marine vessel 220.

The controller 213 controls the ECU 151, the SCU 152, etc. of the outboard motor 100 based on the operations of the operating unit 212. The controller 213 includes, for example, a CPU (Central Processing Unit) (not shown), a ROM (Read Only Memory) (not shown), a RAM (Random Access Memory) (not shown), etc.

In the outboard motor 100, the ECU 151 controls driving of the engine 131 and driving of a shift actuator (not shown) based on the control performed by the controller 213. The SCU 152 controls driving of the steering mechanism 140 based on the control performed by the controller 213. The ECU 151 includes, for example, a CPU (not shown), a ROM (not shown), a RAM (not shown), etc. The SCU 152 includes, for example, a CPU (not shown), a ROM (not shown), a RAM (not shown), etc.

As shown in FIG. 2, the outboard motor 100 includes an outboard motor main body 102. The outboard motor main body 102 is attached to the stern 211 of the hull 210 via a bracket 101.

Figure 3:
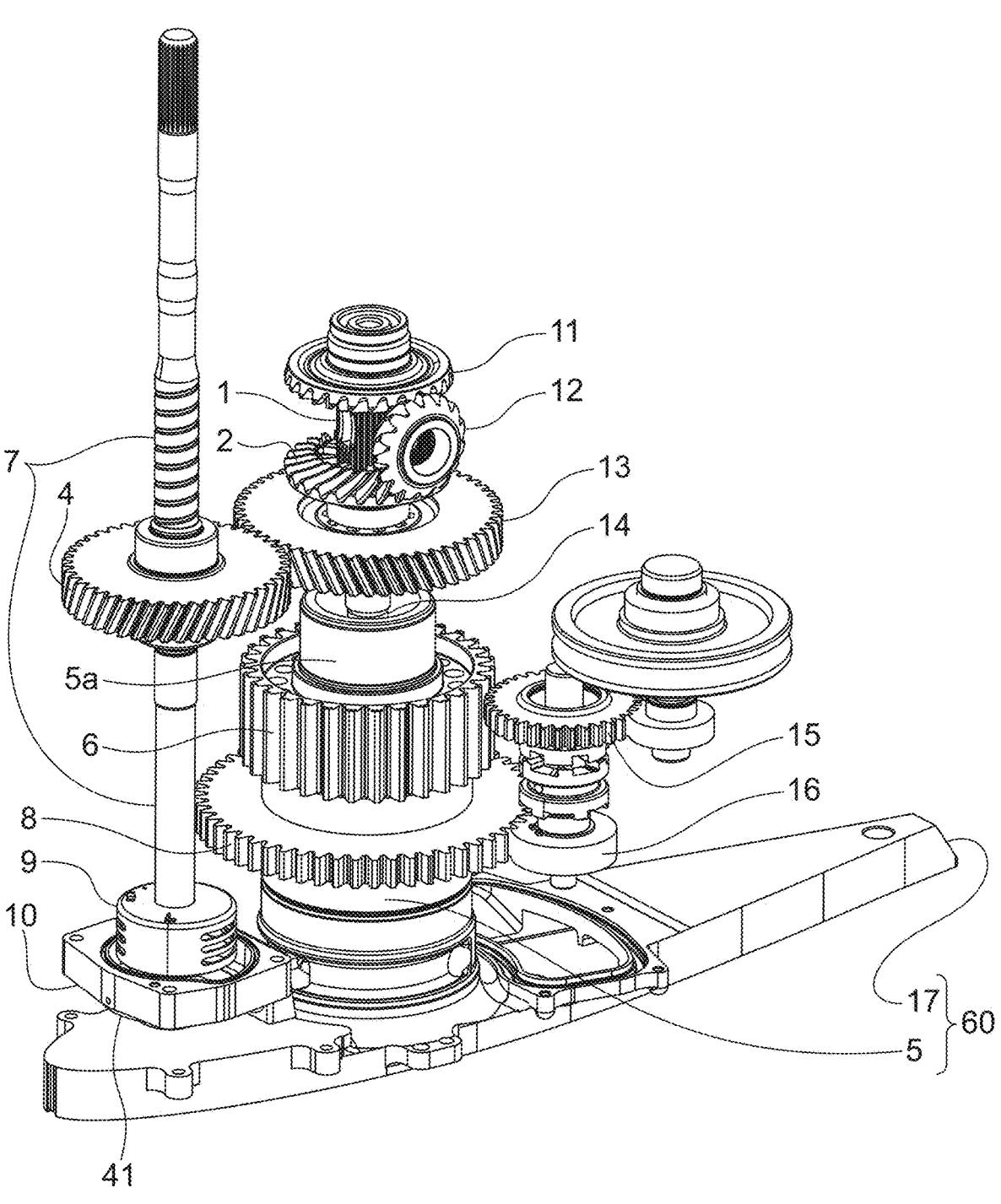
FIG. 3 is a perspective view of a principal portion of a main drive mechanism to drive a water pump assembly and a propeller.

The outboard motor main body 102 includes an upper portion 110, a lower portion 120, and a support portion 60 (see FIG. 3). Although the configuration of the support portion 60 will be described in detail with reference to FIGS. 3 and 4, generally speaking, the support portion 60 includes a movable case member 17 and a steering shaft member 5.

The support portion 60 rotatably supports the lower portion 120 relative to the upper portion 110 about a steering shaft 5a of the steering shaft member 5 and rotates integrally with the lower portion 120. That is, in the outboard motor 100, the upper portion 110 of the outboard motor main body 102 does not rotate with respect to the hull 210, but the lower portion 120 of the outboard motor main body 102 rotates with respect to the hull 210.

Hereinafter, a vertical direction of the outboard motor main body 102 will be specified based on a posture in which the marine vessel 220 is navigating, as shown in FIG. 2.

The upper portion 110 is attached to the stern 211 via the bracket 101. The lower portion 120 includes the propeller 135 and is located below the upper portion 110. The upper portion 110 includes a cowl 111 that houses the engine 131, and an upper case 112 that is located below the cowl 111 and is attached to the stern 211. The lower portion 120 includes a lower case 121.

The outboard motor main body 102 includes the engine 131, a pump drive shaft 7, a second drive shaft 14 (a gear drive shaft), a gear portion 133, a propeller shaft 134 (a propeller shaft), and the propeller 135. The engine 131 is an example of a drive source to provide a rotational force to rotate the propeller shaft 134. A first drive shaft 138 is an output shaft of the engine 131 and is rotated by an output from a crankshaft (not shown). The pump drive shaft 7 is concentric with the first drive shaft 138 and rotates integrally with the first drive shaft 138.

The second drive shaft 14 is separate from the pump drive shaft 7 and the first drive shaft 138 (that is, the second drive shaft 14 is not concentric with the pump drive shaft 7 and the first drive shaft 138) and is parallel or substantially parallel to the pump drive shaft 7 and the first drive shaft 138. The gear portion 133 is located within the lower case 121. The gear portion 133 is connected to a lower end portion of the second drive shaft 14. The propeller shaft 134 is connected to the gear portion 133. The propeller shaft 134 is located behind the gear portion 133 so as to extend in a front-rear direction. The propeller 135 is connected to the rear end portion of the propeller shaft 134. The propeller 135 is located outside the lower case 121 so as to be exposed outside the outboard motor main body 102.

A fixed case member 31 (a fixed portion) is fixed relative to the upper portion 110. The fixed case member 31 is fixed relative to a steering housing (not shown) that covers the steering mechanism 140, and the steering housing is fixed to the upper portion 110. A water pump assembly 10 is located within the fixed case member 31. The water pump assembly 10 is located at a lower end portion 7a of the pump drive shaft 7 and is driven by the pump drive shaft 7. The pump drive shaft 7 is rotated by the rotational force from the engine 131 through the first drive shaft 138. The water pump assembly 10 supplies cooling water to the engine 131.

The lower portion 120 includes water inlet portions (two water inlet portions 136 and two water inlet portions 137) to take in external water. The two water inlet portions 136 are provided on the left side portion and the right side portion of the lower case 121, respectively. In addition, the two water inlet portions 137 are also provided on the left side portion and the right side portion of the lower case 121, respectively. In a side view, the water inlet portion 136 is located in front of the gear portion 133, and the water inlet portion 137 is located behind and above the water inlet portion 136. The water inlet portion 136 includes a filter 136a, and the water inlet portion 137 includes a filter 137a. The filter 136a and the filter 137a are referred to as first filters.

FIG. 3 is a perspective view of a principal portion of a main drive mechanism that drives the water pump assembly 10 and the propeller 135. The components shown in FIG. 3 are located in the upper portion 110 except for the support portion 60.

Figure 4:
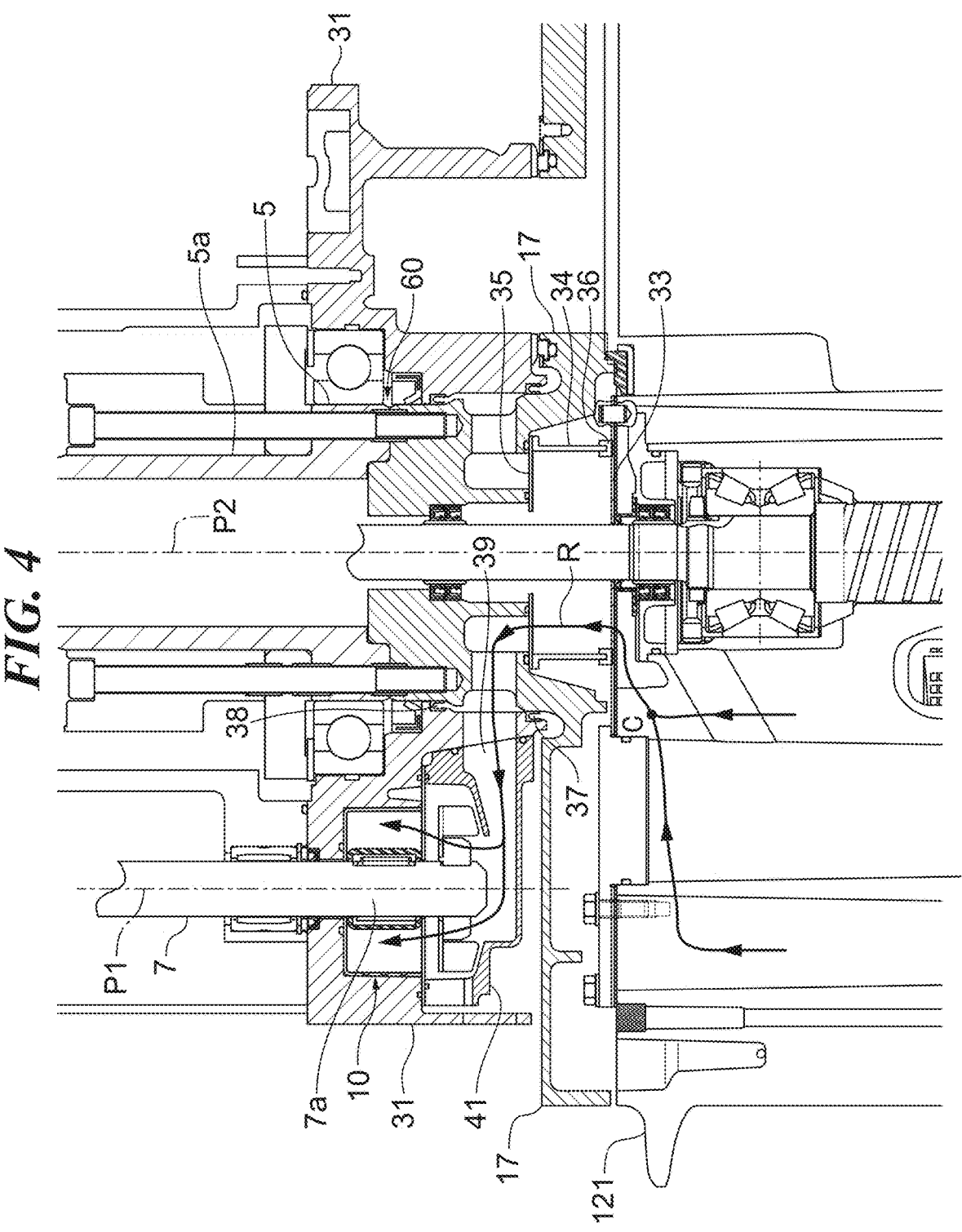
FIG. 4 is a longitudinal cross-sectional view of a steering mechanism and its surroundings.

FIG. 4 is a longitudinal cross-sectional view of the steering mechanism 140 and its surroundings. The cross section shown in FIG. 4 is a cross section parallel to an axial center P1 of the pump drive shaft 7 and an axial center P2 of the steering shaft member 5 and includes the axial center P1 and the axial center P2. It should be noted that the axial center P1 and the axial center P2 are parallel or substantially parallel.

The main drive mechanism and a water channel R will be described with reference to FIGS. 3 and 4.

First, as shown in FIG. 3, the main drive mechanism includes a dog clutch 1, a bevel gear 2, a helical gear 4, the steering shaft member 5, a pinion gear 6, the pump drive shaft 7, a gear 8, the water pump assembly 10, a bevel gear 11, a gear 12, and a helical gear 13. The main drive mechanism further includes the second drive shaft 14, a reduction gear 15, a gear 16, the support portion 60, and a hydraulic cylinder 144 (see FIG. 2, but the hydraulic cylinder 144 is not shown in FIGS. 3 and 4). The water pump assembly 10 includes an upper housing 9 and a lower housing 41 (a housing portion).

The steering mechanism 140 includes the support portion 60, a first mechanism, and a second mechanism. The first mechanism includes a motor (not shown), the reduction gear 15, the gear 16, and the gear 8. The second mechanism includes the hydraulic cylinder 144 (see FIG. 2), a rack gear (not shown), and the pinion gear 6.

The first drive shaft 138 is rotationally driven by the output from the crankshaft (not shown). Then, the water pump assembly 10 is driven by the pump drive shaft 7, which rotates integrally with the first drive shaft 138. At the same time, the helical gear 4, which rotates integrally with the first drive shaft 138, rotationally drives the helical gear 13.

The rotation of the helical gear 13 is transmitted to the bevel gear 2, and is further transmitted to the bevel gear 11 via the gear 12. The bevel gear 2 and the bevel gear 11 rotate in directions opposite to each other. When a shift actuator (not shown) moves the dog clutch 1 in an axial direction of the second drive shaft 14, the switching between the forward state, the reverse state, and the neutral state is performed.

The second drive shaft 14 rotates integrally with the dog clutch 1 around the axial center P2 (see FIG. 4). The second drive shaft 14 rotates in the same direction as the gear, among the bevel gear 2 and the bevel gear 11, meshing with the dog clutch 1. A rotational force of the second drive shaft 14 rotates the propeller shaft 134 (see FIG. 2) via the gear portion 133 within the lower portion 120.

The axial center P2 is an axial center of the second drive shaft 14, and is also an axial center of the steering shaft 5a of the steering shaft member 5. That is, the steering shaft member 5 is concentric with the second drive shaft 14. The pinion gear 6 and the gear 8 rotate integrally with the steering shaft member 5.

In the steering mechanism 140, either the first mechanism or the second mechanism is activated selectively according to an instruction from a marine vessel operator. It should be noted that the steering mechanism 140 does not need to include both the first mechanism and the second mechanism, and may include only one of the first mechanism and the second mechanism.

First, in the case that the first mechanism is activated according to the instruction from the marine vessel operator, a rotational force from the motor (not shown) in the first mechanism is transmitted to the gear 8 via the reduction gear 15 and the gear 16. Thus, the movable case member 17 is rotationally driven integrally with the steering shaft member 5. As a result, the lower portion 120 is steered (rotationally driven) with respect to the upper portion 110.

On the other hand, in the case that the second mechanism is activated according to the instruction from the marine vessel operator, the rack gear (not shown) is moved by a driving force from the second mechanism (the hydraulic cylinder 144 (see FIG. 2)), and the pinion gear 6 is rotationally driven by the rack gear. As a result, the lower portion 120 is steered (rotationally driven) with respect to the upper portion 110.

The water channel R will be described with reference to FIG. 4. The water channel R is defined by an inside space of the lower case 121, an inside space of the movable case member 17, an inside space of the fixed case member 31, and an inside space of the lower housing 41 of the water pump assembly 10.

The movable case member 17 of the support portion 60 is fixed with respect to the lower portion 120. The movable case member 17 is fixed to an upper portion of the lower case 121. A plate 33 is interposed between the lower case 121 and the movable case member 17. For example, the plate 33 is made of metal.

In a space inside the support portion 60, a second filter 35 is fixed to the support portion 60. First, in the inside space of the movable case member 17, the second filter 35 is fixed to an upper portion of a cylindrical member 34, and the second filter 35 is further fixed to the movable case member 17. Specifically, an annular member 36 is sandwiched between a lower portion of the cylindrical member 34 and an upper surface of the plate 33. The second filter 35 and the upper portion of the cylindrical member 34 are jointly fastened to the movable case member 17 by bolts (not shown), for example. Therefore, the second filter 35 is also fixed with respect to the lower portion 120 through the cylindrical member 34 and the annular member 36. For example, the annular member 36 is made of an elastic material such as rubber.

As described above, the movable case member 17 is rotationally driven by the first mechanism or the second mechanism described above. Since the fixed case member 31 does not rotate, a portion slides between the fixed case member 31 and the movable case member 17. Seal portions 37 and 38 are located in the portion which slides between the fixed case member 31 and the movable case member 17 (a steering portion). Therefore, the portion of the water channel R that slides between the fixed case member 31 and the movable case member 17 (a portion of the water channel R that slides between the fixed case member 31 and the movable case member 17) is sealed by the seal portions 37 and 38.

A main route of the water channel R is a route from the water inlet portions 136 and 137 to the water pump assembly 10 via the support portion 60, and passes through the second filter 35 on the way. It should be noted that the water channels R from the water inlet portions 136 and 137 (the water taken in from the water inlet portions 136 and 137) join at a confluence position C. In the water channel R, the second filter 35 is located upstream of the seal portions 37 and 38. In particular, since the position where the second filter 35 is disposed is downstream of the confluence position C, only one filter (only the second filter 35) is required.

The second filter 35 has a mesh size smaller than a mesh size of the filters 136a and 137a (the first filters). This may be synonymous with "the second filter 35 has a filtration accuracy higher than a filtration accuracy of the first filter". Alternatively, this may be synonymous with "a minimum size of foreign matter that the second filter 35 does not allow to pass is smaller than a minimum size of foreign matter that the first filter does not allow to pass".

Although relatively large foreign matters are removed by the filters 136a and 137a, fine foreign matters enter the water channel R. However, in a preferred embodiment of the present invention, since the mesh size of the second filter 35 is smaller than the mesh size of the filters 136a and 137a, the foreign matter, which has passed through the filters 136a and 137a but is blocked (prevented) from passing by the second filter 35, does not reach the seal portions 37 and 38 at the steering portion. Therefore, it is possible to prevent the foreign matter from getting caught in the seal portions 37 and 38.

In addition, a cross-sectional area of the water channel R at the position where the second filter 35 is disposed is larger than a cross-sectional area of the water channel R at the position where the first filter is disposed. This makes the second filter 35 less likely to cause clogging. In particular, since the second filter 35 is disposed at the support portion 60, the second filter 35 is located within the water channel R where it is easy to secure a large cross-sectional area. This point is also advantageous from the viewpoint of preventing clogging.

In addition, a total area of a water-passing portion of the second filter 35 (a portion through which the water passes in the second filter 35) is larger than a total area of a water-passing portion of the first filter (a portion through which the water passes in the first filter). As a result, it is possible to prevent clogging.

The lower housing 41 of the water pump assembly 10 includes a receiving port 39. In the water channel R, the water sucked up from the lower portion 120 to the support portion 60 is received from the receiving port 39 into the interior of the water pump assembly 10. The received water passes through a pipe (not shown) from the water pump assembly 10 and is supplied to a cooling water circulation path (not shown) in the engine 131. The water that has cooled the engine 131 is discharged to the outside from a draining portion (not shown).

Figure 5:
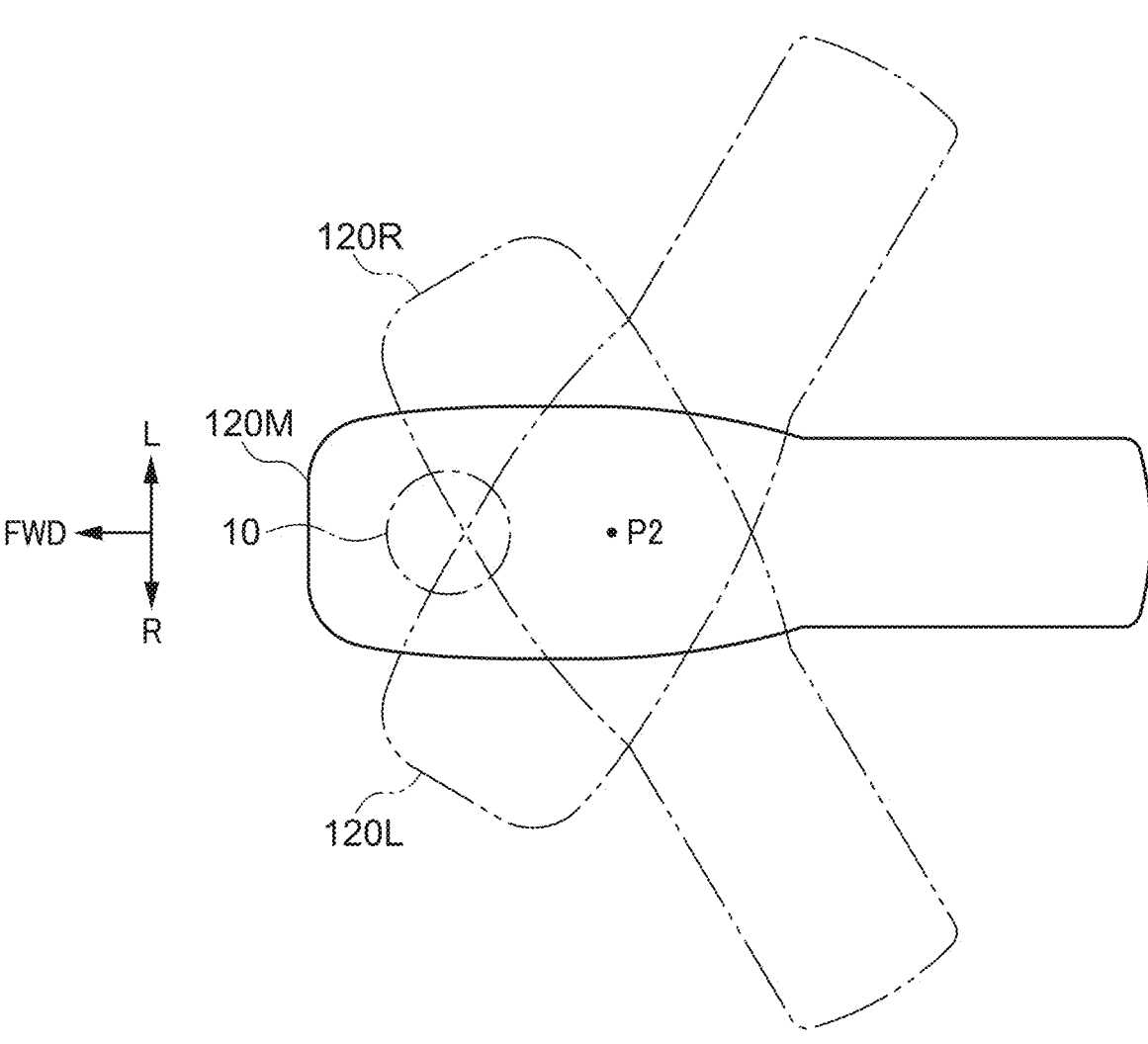
FIG. 5 is a schematic view of a lower portion of the outboard motor in a posture in which the marine vessel is navigating, when viewed from below.

FIG. 5 is a schematic view of the lower portion 120 of the outboard motor 100 in a posture in which the marine vessel 220 is navigating, when viewed from below. FIG. 5 shows a positional relationship between the lower portion 120 and the water pump assembly 10 when viewed along a direction of the axial center P2 of the steering shaft member 5.

The lower portion 120 at a rotation position corresponding to an angle that makes the marine vessel 220 travel straight ahead, among rotation angles that can be taken by the lower portion 120 with respect to the upper portion 110 by the steering mechanism 140, is indicated as a lower portion 120M. In addition, the lower portion 120 at a rotation position corresponding to an angle at which the largest right turn is performed, among the rotation angles that can be taken by the lower portion 120 with respect to the upper portion 110 by the steering mechanism 140, is indicated as a lower portion 120R. Moreover, the lower portion 120 at a rotation position corresponding to an angle at which the largest left turn is performed, among the rotation angles that can be taken by the lower portion 120 with respect to the upper portion 110 by the steering mechanism 140, is indicated as a lower portion 120L.

First, in the case that the lower portion 120 is at a straight-ahead position (a first rotation position), the water pump assembly 10 overlaps the lower portion 120M when viewed along the direction of the axial center P2 (a shaft line direction), and the water pump assembly 10 is hidden from view by the lower portion 120M when viewed from below. The straight-ahead position is a steering position when the marine vessel 220 travels straight ahead.

On the other hand, in the case that the lower portion 120 is at a steering position when a maximum steering to the left or right is performed (a second rotation position), a portion of the water pump assembly 10 does not overlap the lower portion 120L or the lower portion 120R when viewed along the direction of the axial center P2. That is, the portion of the water pump assembly 10 is visible when viewed from below. Here, the steering position when the maximum steering to the left or right is performed is simply referred to as a maximum steering position. It should be noted that even in the case that the lower portion 120 does not reach the maximum steering position, there is an angle range where the portion of the water pump assembly 10 does not overlap the lower portion 120L or the lower portion 120R.

By steering the lower portion 120 until the portion of the water pump assembly 10 becomes visible when viewed from below, access to the water pump assembly 10 is facilitated, and for example, it is possible to easily perform maintenance work or the like. It is assumed that actual maintenance is performed in a state in which the outboard motor 100 is tilted up and the lower portion 120 is steered by a significant amount (for example, to the maximum steering position or its vicinity).

Moreover, the water pump assembly 10 is located at the lower end portion 7a of the pump drive shaft 7, and the portion of the water pump assembly 10 is always exposed to the outside of the outboard motor 100. Specifically, a portion of the lower housing 41 is always exposed and is in contact with the water or the atmosphere. Therefore, by steering the lower portion 120 a significant amount, it is possible to easily perform operations such as removing the lower housing 41 and replacing internal components. As a result, it is possible to enhance the maintainability of the water pump assembly 10.

According to a preferred embodiment of the present invention, the portion of the water channel R that slides between the fixed case member 31 and the movable case member 17 (the steering portion) is sealed by the seal portions 37 and 38 (see FIG. 4). The second filter 35, which has the mesh size smaller than the mesh size of the filters 136a and 137a (the first filters), is located in the water channel R upstream of the seal portions 37 and 38 and downstream of the water inlet portions 136 and 137. The second filter 35 has the filtration accuracy higher than the filtration accuracy of the filters 136a and 137a (the first filters). Therefore, the foreign matter, which has passed through the filters 136a and 137a but is blocked (prevented) from passing by the second filter 35, does not reach the seal portions 37 and 38. As a result, it is possible to prevent the foreign matter from getting caught in the seal portions 37 and 38 disposed at the steering portion.

In addition, the second filter 35 is disposed on the support portion 60, which is able to easily secure a large area. In addition, the cross-sectional area of the water channel R at the position where the second filter 35 is disposed is larger than the cross-sectional area of the water channel R at the position where the first filter is disposed. Therefore, it is advantageous in designing the second filter 35 to be less likely to clog.

It should be noted that from the viewpoint of making the second filter 35 even less likely to be clogged, the second filter 35 may not be perpendicular or substantially perpendicular to the water channel R, and may be curved with respect to the water channel R so as to provide a large total area of the water-passing portion of the second filter 35.

In addition, even in the case that there are a plurality of the water inlet portions 136 and 137, since the second filter 35 is located downstream of the confluence position C, only one filter (only the second filter 35) is required.

In addition, according to a preferred embodiment of the present invention, when viewed along an axial center direction of the steering shaft member 5 (a direction parallel to the axial center P2), at the first rotation position (the straight-ahead position) of the lower portion 120 with respect to the upper portion 110, the water pump assembly 10 overlaps the lower portion 120M (see FIG. 5). On the other hand, at the steering position when the maximum steering to the left or right is performed (the second rotation position), at least a portion of the water pump assembly 10 does not overlap the lower portion 120L or the lower portion 120R. As a result, it is possible to enhance the maintainability of the water pump assembly 10.

In addition, the second drive shaft 14, which transmits the driving force to the propeller shaft 134, and the pump drive shaft 7, which transmits the driving force to the water pump assembly 10, are separate shafts. Moreover, the water pump assembly 10 is located at the lower end portion 7a of the pump drive shaft 7. As a result, it is easy to use a configuration in which the portion of the water pump assembly 10 is exposed to the outside of the outboard motor 100.

In addition, a portion of the water pump assembly 10 is always exposed to the outside of the outboard motor 100. As a result, depending on the design, it is possible to perform simple maintenance of the water pump assembly 10 even without entering a steering state. Moreover, from the viewpoint of enhancing the maintainability, in the case that the design enables maintenance by exposing the portion of the water pump assembly 10 to the outside even at the straight-ahead position, it is not essential that the lower portion 120 is rotatable with respect to the upper portion 110.

It should be noted that when viewed along the axial center direction of the steering shaft member 5 (the direction parallel to the axial center P2), at the steering position of the lower portion 120 when the maximum steering to the left or right is performed (the second rotation position), the water pump assembly 10 may be configured so that the entire water pump assembly 10 does not overlap the lower portion 120L or the lower portion 120R. As a result, it is possible to further enhance the maintainability of the water pump assembly 10.

It should be noted that it is not necessary to include a plurality of water inlet portions 136 and the number of the water inlet portions 136 may be one. Moreover, it is also not necessary to include a plurality of water inlet portions 137 and the number of the water inlet portions 137 may be one. Further, the lower portion 120 may include only one water inlet portion 136, only the plurality of water inlet portions 136, only one water inlet portion 137, or only the plurality of water inlet portions 137. Moreover, the lower portion 120 may include one water inlet portion 136 and the plurality of water inlet portions 137. Furthermore, the lower portion 120 may include the plurality of water inlet portions 136 and one water inlet portion 137.

It should be noted that the second filter 35 may have a filtration function, and for example, a resin lock or a resin-sintered porous body may be used.

Although the present invention has been described in detail based on its preferred embodiments, the present invention is not limited to these specific preferred embodiments, and various preferred embodiments are also included in the present invention without departing from the gist of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
a lower portion including a propeller shaft;
an upper portion including a drive source to provide a rotational force to rotate the propeller shaft;
a support portion to rotatably support the lower portion relative to the upper portion about a steering shaft and rotate integrally with the lower portion;
a water pump assembly in the upper portion to supply water to the drive source; and
a water inlet including a first filter in the lower portion to take in external water; wherein
a water channel extends from the water inlet to the water pump assembly via the support portion;
a seal to seal the water channel is between a fixed portion fixed with respect to the upper portion and the support portion; and
a second filter, which has a mesh size smaller than a mesh size of the first filter, is in the water channel upstream of the seal and downstream of the water inlet.

2. The outboard motor according to claim 1, wherein the second filter is on the support portion.

3. The outboard motor according to claim 1, wherein a cross-sectional area of the water channel where the second filter is located is larger than a cross-sectional area of the water channel where the first filter is located.

4. The outboard motor according to claim 1, wherein a total area of a water-passing portion of the second filter is larger than a total area of a water-passing portion of the first filter.

5. The outboard motor according to claim 1, wherein
the water inlet includes a plurality of water inlets;
the water taken up from the plurality of water inlets joins together at a confluence portion; and
the second filter is downstream of the confluence portion.

6. The outboard motor according to claim 1, wherein
the water pump assembly is driven by a pump drive shaft rotated by a rotational force from the drive source;
the water pump assembly is located at an end portion of the pump drive shaft;
an output shaft of the drive source and the pump drive shaft are concentric; and
a gear drive shaft to drive a gear to rotate the propeller shaft is concentric with the steering shaft and not concentric with the pump drive shaft.

7. The outboard motor according to claim 1, wherein the second filter is fixed to the support portion in a space inside the support portion.

8. The outboard motor according to claim 7, wherein the second filter is fixed to the lower portion via a cylindrical body.

9. An outboard motor comprising:
a lower portion including a propeller shaft;
an upper portion including a drive source to provide a rotational force to rotate the propeller shaft;

a support portion to rotatably support the lower portion relative to the upper portion about a steering shaft and rotate integrally with the lower portion;

a water pump assembly in the upper portion to supply water to the drive source; and a water inlet including a first filter in the lower portion to take in external water; wherein a water channel extends from the water inlet portion to the water pump assembly via the support portion;

a seal to seal the water channel is between a fixed portion fixed with respect to the upper portion and the support portion; and a second filter, having a filtration accuracy higher than a filtration accuracy of the first filter, is located in the water channel upstream of the seal and downstream of the water inlet.

10. A marine vessel comprising:

the outboard motor according to claim 1.

11. A marine vessel comprising:

the outboard motor according to claim 9.

* * * * *